United States Patent
Tamaki (10) Patent No.: US 12,363,430 B2
(45) Date of Patent: Jul. 15, 2025

(54) IMAGE PROCESSING APPARATUS, DISPLAY APPARATUS, AND IMAGE PROCESSING METHOD

(71) Applicant: CANON KABUSHIKI KAISHA, Tokyo (JP)

(72) Inventor: Yoshihito Tamaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 214 days.

(21) Appl. No.: 18/345,014

(22) Filed: Jun. 30, 2023

(65) Prior Publication Data

US 2024/0015399 A1  Jan. 11, 2024

(30) Foreign Application Priority Data

Jul. 7, 2022 (JP) .................................. 2022-109772

(51) Int. Cl.
| | |
|---|---|
| *H04N 23/71* | (2023.01) |
| *G02B 27/01* | (2006.01) |
| *H04N 23/67* | (2023.01) |

(52) U.S. Cl.
CPC ......... *H04N 23/67* (2023.01); *G02B 27/0172* (2013.01); *H04N 23/71* (2023.01)

(58) Field of Classification Search
CPC ........ H04N 23/67; H04N 23/71; H04N 23/63; H04N 23/667; H04N 23/672; G02B 27/0172
See application file for complete search history.

(56) References Cited

U.S. PATENT DOCUMENTS

| | | | | |
|---|---|---|---|---|
| 5,945,965 A | * | 8/1999 | Inoguchi | G09G 3/003 348/E13.043 |
| 2013/0258073 A1 | * | 10/2013 | Kozak | H04N 13/106 348/56 |
| 2014/0186052 A1 | * | 7/2014 | Oshima | H04N 23/73 398/130 |
| 2020/0196855 A1 | * | 6/2020 | Cui | G16H 30/40 |
| 2023/0254471 A1 | * | 8/2023 | Tamaki | H04N 23/672 348/47 |

FOREIGN PATENT DOCUMENTS

| | | |
|---|---|---|
| JP | 2014-182360 A | 9/2014 |
| JP | 6908039 B2 | 7/2021 |

* cited by examiner

*Primary Examiner* — Shahbaz Nazrul
(74) *Attorney, Agent, or Firm* — Cowan, Liebowitz & Latman, P.C.

(57) ABSTRACT

An image processing apparatus includes at least one memory that stores a set of instructions, and at least one processor that executes the set of instructions to cause at least one display element to display images using a signal obtained by imaging an object through a first optical system and a second optical system that are arranged to generate parallax, acquire luminance information on the object, and witch, according to the luminance information, between first processing for displaying a first image and a second image having parallax on the display element, and second processing for displaying two third images having no parallax on the display element.

15 Claims, 7 Drawing Sheets

| CASE | IMAGE | 3D | 2D |
|---|---|---|---|
| 1 | TARGET 1, EYEPOINT 1 | ◎ $tv3d \leq Tv\_1$ | ○ $tv2d \leq Tv\_1$ |
| 2 | TARGET 2, EYEPOINT 2 | ○ $Tv\_1 \leq tv3d \leq Tv\_2$ | ○ $tv2d \leq Tv\_1$ |
| 3 | TARGET 3, EYEPOINT 3 | △ $Tv\_2 \leq tv3d \leq Tv\_3$ | ○ $tv2d \leq Tv\_1$ |
| 4 | TARGET 4, EYEPOINT 4 | × — | ○ $tv2d \leq Tv\_1$ |

IMAGE PROCESSING APPARATUS, DISPLAY APPARATUS, AND IMAGE PROCESSING METHOD

BACKGROUND

Technical Field

One of the aspects of the embodiments relates to an image processing method that displays an image on a display apparatus, such as a head mount display (HMD).

Description of Related Art

Some display apparatuses, such as HMDs, that allow users to experience virtual reality (VR) and augmented reality (AR) generate a three-dimensional (3D) image that can be stereoscopically viewed by imaging using an image sensor, and display the 3D image.

Japanese Patent No. 6908039 discloses a display apparatus that switches between the display of a 3D image that provides stereoscopic viewing and a two-dimensional (2D) image with an extended depth of field according to information about an imaging situation. The imaging condition referred to here is an optical zoom value, an electronic zoom value, user operation information by the user, parallax information, and distance information. Japanese Patent Laid-Open No. 2014-182360 discloses an image pickup apparatus that performs a pupil division type focus detection using an image sensor in which a microlens disposed on each of a plurality of two-dimensionally arranged pixels.

However, the display apparatus disclosed in Japanese Patent No. 6908039 automatically switches a display image between a 3D image and a 2D image according to the information about the imaging situation regardless of the luminance of the imaging environment (object). Thus, even if the user wishes to display a 3D image, a 2D image may be displayed, and the usability (visibility) deteriorates.

In the focus detection disclosed in Japanese Patent Laid-Open No. 2014-182360, as the luminance of the imaging environment lowers, the sensitivity of the image sensor is increased or the charge accumulation time is made longer. In a case where the charge accumulation time is made longer, the image acquiring interval (cycle) through imaging becomes longer, an image display rate lowers, and smooth image display becomes difficult.

SUMMARY

An image processing apparatus according to one aspect of the disclosure includes at least one memory that stores a set of instructions, and at least one processor that executes the set of instructions to cause at least one display element to display images using a signal obtained by imaging an object through a first optical system and a second optical system that are arranged to generate parallax, acquire luminance information on the object, and switch, according to the luminance information, between first processing for displaying a first image and a second image having parallax on the display element, and second processing for displaying two third images having no parallax on the display element. A display apparatus having the above image processing apparatus, an image processing method corresponding to the above image processing apparatus, and a storage medium storing a program that causes a computer to execute the above image processing method also constitute another aspect of the disclosure.

Further features of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

<Configuration of Head Mount Display>

Figure 2:
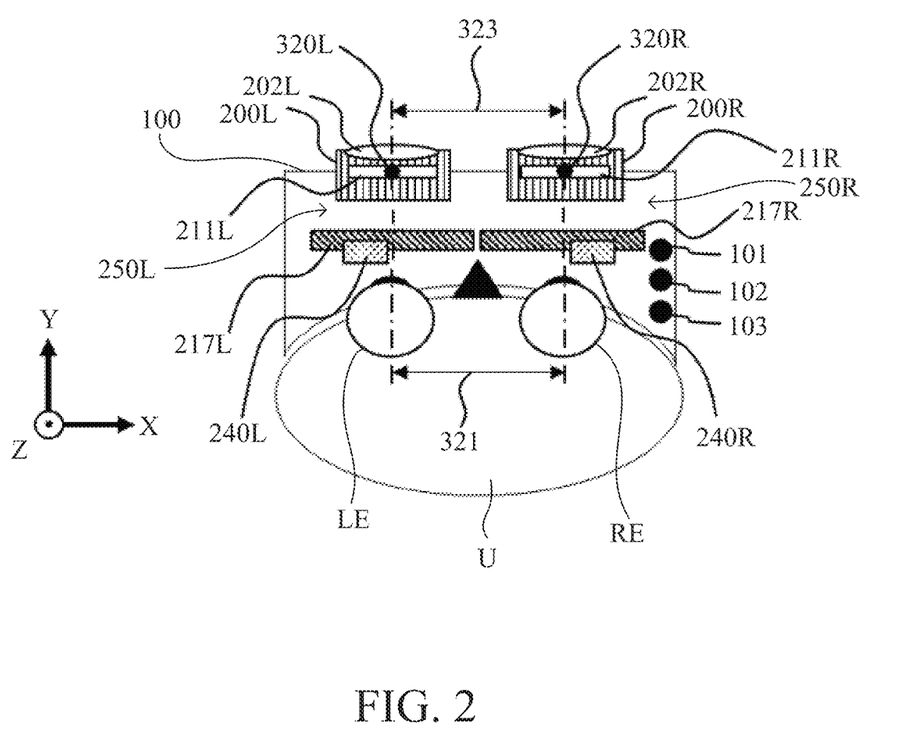
FIG. 2 is a top view illustrating the configuration of the HMD according to the embodiment.

FIG. 2 is a schematic top view of a configuration of an HMD 100 as a display apparatus according to one embodiment of the present disclosure. The HMD 100 is attached to a head of a user U, and presents a right-eye image and a left-eye image to a right eye RE and a left eye LE of the user U, respectively. In FIG. 2, a Z direction corresponds to a vertical (up-down) direction, an X direction corresponds to a horizontal (left-right) direction, and a Y direction corresponds to a depth (front-rear) direction.

The HMD 100 includes a right-eye imaging display unit 250R and a left-eye imaging display unit 250L. The right-eye imaging display unit 250R includes a right-eye imaging unit 200R including a right-eye optical system (first optical system) 202R and a right-eye image sensor (first image sensor, first imaging area) 211R, and a right-eye display element (first display element, first display area) 217R. The left-eye imaging display unit 250L includes a left-eye imaging unit 200L including a left-eye optical system (second optical system) 202L and a left-eye image sensor (second image sensor, second imaging area) 211L, and a left-eye display element (second display element) 217L.

The right-eye image sensor 211R and the left-eye image sensor 211L may be imaging areas different from each other in a single image sensor. In this case, each of the right-eye optical system 202R and the left-eye optical system 202L may be bent using two reflective surfaces so that a distance between the right-eye and left-eye optical systems 202R and 202L on the image side is reduced. The right-eye display element 217R and the left-eye display element 217L may be different display areas in a single display element.

The right-eye optical system 202R and the left-eye optical system 202L are arranged in parallel so as to generate parallax for the object. Each of the right-eye optical system 202R and left-eye optical system 202L includes one or more optical elements such as lenses, prisms, and mirrors, and images light from the object on the right-eye image sensor 211R and left-eye image sensor 211L. Each of the right-eye image sensor 211R and the left-eye image sensor 211L includes a photoelectric conversion element such as a CMOS sensor or a CCD sensor, photoelectrically converts (images) the object images formed on these imaging planes to output imaging signals as electrical signals. The imaging signal output from the right-eye image sensor 211R corresponds to a first signal, and the imaging signal output from the left-eye image sensor 211L corresponds to a second signal. A right-eye image (first image) and a left-eye image (second image) that have parallax and can be observed as a stereoscopic (3D) image are obtained from the imaging signals output from the right-eye image sensor 211R and the left-eye image sensor 211L, respectively.

Each of the right-eye display element 217R and the left-eye display element 217L includes a display device such as an LCD panel or an organic EL panel, and displays a right-eye image corresponding to right-eye image data and a left-eye image corresponding to left-eye image data. Although not illustrated in FIG. 2 but illustrated in FIG. 1, each of the right-eye imaging display unit 250R and the left-eye imaging display unit 250L includes an eyepiece optical system 116 that enables the right eye RE and left eye LE of the user to observe magnified right-eye image and left-eye image displayed on the right-eye display element 217R and the left-eye display element 217L.

The right-eye imaging display unit 250R and the left-eye imaging display unit 250L include imaging adjusters 320L and 320R, respectively. The imaging adjusters 320L and 320R rotate the right-eye imaging unit 200R and left-eye imaging unit 200L in the X direction around an axis parallel to the Z direction in order to adjust convergence angles (or convergence distances) of the right-eye imaging unit 200R and left-eye imaging unit 200L, respectively. This configuration can provide a convergence state according to the distance to the object that the user wishes to stereoscopically view. The imaging adjusters 320L and 320R move the right-eye imaging unit 200R and the left-eye imaging unit 200L in the X direction so as to adjust a base length 323 as a distance in the X direction between the imaging optical axes (illustrated by alternate long and short dash lines in FIG. 2). Thereby, the base length can be adjusted according to a distance 321 between the right eye RE and left eye LE of the user.

The HMD 100 further includes a shutter button 101, a power switch 102, and a mode switch 103, which will be described below.

Figure 1:
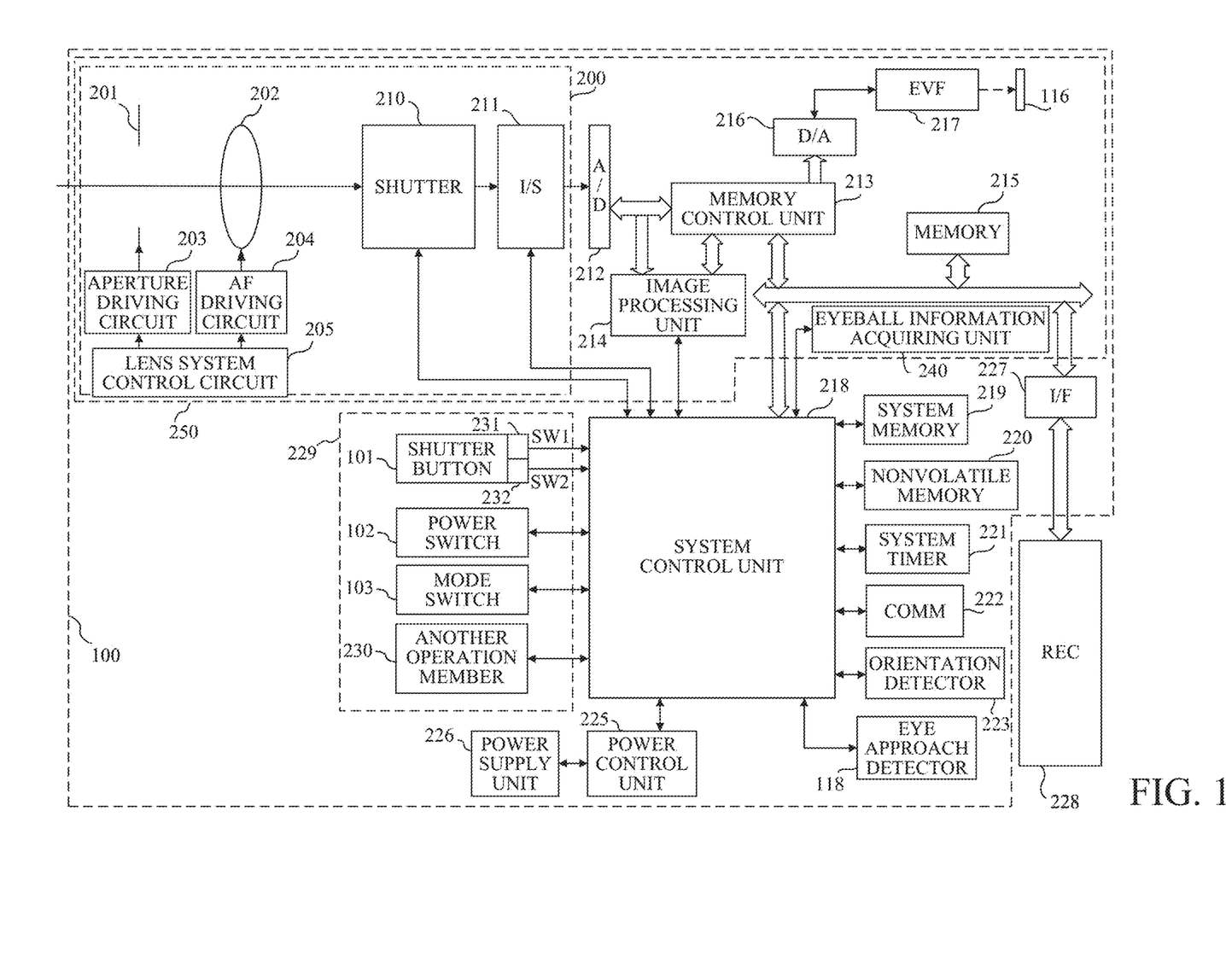
FIG. 1 is a block diagram illustrating a configuration of an HMD according to this embodiment.

FIG. 1 illustrates the internal configuration of the HMD 100. FIG. 1 illustrates one of the right-eye imaging display unit 250R and the left-eye imaging display unit 250L illustrated in FIG. 2 as an imaging display unit 250. FIG. 1 also illustrates one of the right-eye imaging unit 200R (right-eye optical system 202R, right-eye image sensor 211R) and left-eye imaging unit 200L (left-eye optical system 202L, left-eye image sensor 211L) as an imaging unit 200 (optical system 202, image sensor (US) 211). FIG. 1 also illustrates one of the right-eye display element 217R and the left-eye display element 217L as a display element 217.

The imaging unit 200 includes an aperture stop (diaphragm) 201, an optical system 202, an aperture driving circuit 203, an autofocus (AF) driving circuit 204, a lens control circuit 205, a shutter 210, and the image sensor 211. The imaging unit 200 further includes an analog-to-digital (A/D) converter 212, a memory control unit 213, an image processing unit 214, a memory 215, a digital-to-analog (D/A) converter 216, the display element 217, and a non-volatile memory 220.

The aperture stop 201 is an optical member for adjusting a light amount incident from the object by changing its aperture diameter. The aperture driving circuit 203 drives the aperture stop 201 to change its aperture diameter. The optical system 202 images light from the object as described above. The AF driving circuit 204 drives the optical system 202 for focusing. The lens control circuit 205 controls the driving of the aperture stop 201 and the optical system 202 by controlling the aperture driving circuit 203 and the AF driving circuit 204 according to an aperture driving command and a focus driving command from the system control unit 218, which will be described below.

The shutter 210 is a mechanical shutter such as a focal plane shutter, and operates according to a command from the system control unit 218 to control an exposure amount of the image sensor 211. The image sensor 211 converts the object image into an imaging signal as described above. The image sensor 211 includes a microlens that divides the object image into two for each pixel to form a pair of phase-difference images, photoelectrically converts the pair of phase-difference images for each pixel, and outputs a pair of phase-difference images. The image sensor 211 includes a circuit that combines a pair of phase-difference image signals from a plurality of pixels within a set focus detecting range to generate and output a pair of focus detecting signals. The system control unit 218 detects a phase difference between the pair of focus detecting signals from the image sensor 211 and acquires a defocus amount from the phase difference. From the acquired defocus amount, the system control unit 218 calculates the driving amount of the optical system 202 for obtaining a focused state for the object, and outputs a focus driving command to the lens control circuit 205. Thereby, the imaging-plane phase-difference detection type focus detection (phase-difference AF) can be performed.

The A/D converter 212 converts the imaging signal as an analog signal output from the image sensor 211 into imaging data as a digital signal and outputs the imaging data to the image processing unit 214 and the memory control unit 213.

The image processing unit 214 performs image processing such as pixel interpolation, reduction/enlargement (resize) processing, and color conversion processing for the imaging data from the A/D converter 212 or the imaging data from the memory control unit 213, and generates image data. The image processing unit 214 also performs Auto-White Balance (AWB) processing for the image data based on a calculation result using the image data. The image data is written into the memory 215 directly or via the memory control unit 213 and is also output to the system control unit 218.

The memory 215 stores image data (image data for recording and display). The memory 215 also serves as an image display memory (video memory). The system control unit 218 performs auto-exposure (AE) processing using the luminance information on the imaging environment obtained from the image data, and performs phase-difference AF processing using the pair of focus detecting signals described above.

The D/A converter 216 converts the display image data read out of the memory 215 into an analog image signal and supplies the analog image signal to the display element 217. Thereby, a display image (right-eye image and left-eye image) is displayed on the display element 217. Live-view display is performed by sequentially displaying on the display element 217 the display image corresponding to image data generated from the imaging signal from the image sensor 211 at a predetermined frame rate.

The system control unit 218 includes at least one processor such as a CPU, and executes a program stored in the nonvolatile memory 220 to control the entire operation of the HMD 100 including AE and AF described above. The system control unit 218 also performs display control for controlling the memory 215, the D/A converter 216, the display element 217, and the like.

The HMD 100 further includes a system memory 219, a system timer 221, a communication unit (COMM) 222, an orientation detector 223, and an eye approach detector 118.

The system memory 219 includes, for example, a RAM, stores constants and variables for the operation of the system control unit 218, and decompresses a program read out of the nonvolatile memory 220. The nonvolatile memory 220 is an electrically erasable/recordable memory, and includes, for example, an EEPROM. The nonvolatile memory 220 stores constants, programs, and the like for the operation of the system control unit 218.

The system timer 221 measures the time for various controls and the time of the built-in clock. The communication unit 222 transmits and receives image data, audio data, and various information to and from an external apparatus connected wirelessly or by wire. The communication unit 222 can also be connected to a wireless Local Area Network (LAN) or the Internet. The communication unit 222 can also communicate with an external apparatus using Bluetooth (registered trademark) or Bluetooth Low Energy.

The orientation detector 223 detects the orientation of the HMD 100 relative to the gravity direction using an acceleration sensor, a gyro sensor, or the like. The system control unit 218 can acquire the movement (pan, tilt, etc.) of the HMD 100 during imaging by the imaging unit 200 through the orientation detector 223.

The eye approach detector 118 uses an infrared proximity sensor or the like, and detects the eye approach and eye separation of the user to and from the eyepiece optical system 116 (that is, whether or not the user wears the HMD 100 on the head). The system control unit 218 switches between display and non-display of the display element 217 according to whether the eye of the user approaches or separates from the eyepiece optical system 116.

The HMD 100 includes a power control unit 225, a power supply unit 226, a recording medium interface (I/F) 227, an operation unit 229, and an eyeball information acquiring unit 240.

The power control unit 225 includes a battery detection circuit, a DC-DC converter, a switch circuit that switches blocks to be energized, and the like, and detects whether or not a battery is installed, the type of battery, and the remaining battery amount. The power supply unit 226 is a primary battery such as an alkaline battery or a lithium battery, a secondary battery such as a NiCd battery, a NiMH battery or a Li battery, an AC adapter, or the like. The recording medium I/F 227 is an interface with a recording medium (REC) 228. A recording medium 228 includes a semiconductor memory, an optical disc, or the like, and records image data for recording.

The operation unit 229 is operated by the user to input various instructions into the system control unit 218. The operation unit 229 includes the shutter button 101, the power switch 102, the mode switch 103, and another operation member 230 such as a dial, a direction key, and a menu button.

The shutter button 101 includes a first shutter switch 231 and a second shutter switch 232. The first shutter switch 231 is turned on by half-pressing the shutter button 101 and generates a first shutter switch signal SW1. Upon receiving the first shutter switch signal SW1, the system control unit 218 performs imaging preparation processing including AF processing, AE processing, AWB processing, and the like. The second shutter switch 232 is turned on by fully pressing the shutter button 101 to generate a second shutter switch signal SW2. Upon receiving the second shutter switch signal SW2, the system control unit 218 performs a series of imaging processing including reading out the imaging signal from the image sensor 211, generating image data, and recording the image data for recording into the recording medium 228.

The mode switch 103 switches the operation mode of the system control unit 218 among an imaging/display mode, a playback mode, an AR display mode, and the like.

The eyeball information acquiring unit 240 acquires an image of the eyeballs (RE, LE) of the user wearing the HMD 100 and calculates information about the visual line of the user from the eyeball image. The system control unit 218 sets the focus detecting range using the information about the visual line.

<Configuration of Image Sensor 211>

Figure 3:
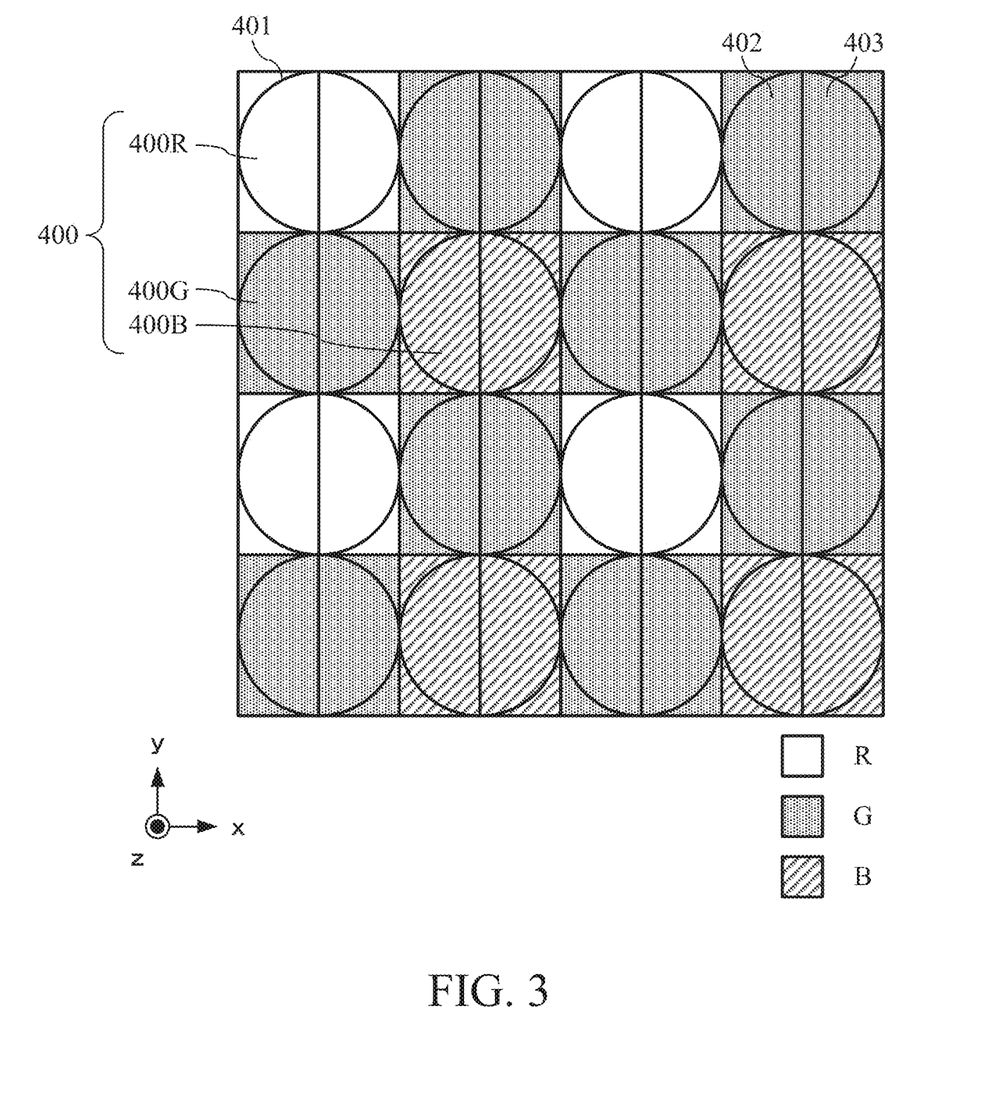
FIG. 3 illustrates a pixel array on an image sensor for the HMD according to the embodiment.

FIG. 3 illustrates a two-dimensional pixel array on the imaging plane of the CMOS sensor as the image sensor 211. While FIG. 3 illustrates an imaging pixel array in a range of 4 columns×4 rows, the actual image sensor 211 includes a larger number of imaging pixels of columns×rows in the vertical direction (y direction) and the horizontal direction (x direction).

One pixel unit 400 includes imaging pixels of 2 columns×2 rows, and these imaging pixels are provided with color filters in a Bayer array. In the pixel unit 400, an imaging pixel 400R having a spectral sensitivity of R (red) is located at the upper left, imaging pixels 400G having a spectral sensitivity of G (green) are located at the upper right and lower left, and an imaging pixel 400B having a spectral sensitivity of B (blue) is located at the lower right, respectively. Each imaging pixel has one microlens 401 and two sub-pixels (focus detecting pixels) 402 and 403 arranged in an array of 2 columns×1 row for the imaging-plane phase-difference detection type focus detection.

The microlens 401 splits a light beam that has passed through the pupil of the optical system 202 into two (that is, performs pupil division). One of the two separated light beams is received by the sub-pixel 402 and the other light beam is received by the sub-pixel 403. An (A+B) signal obtained by adding an A signal and a B signal generated by photoelectric conversion in each of the two sub-pixels 402 and 403 is used to generate an imaging signal, and the A signal and the B signal (or a signal obtained by subtracting the A signal from the A+B signal) is used to generate one and the other of the pair of focus detecting signals. The number of sub-pixels provided for each imaging pixel may be three or more. All imaging pixels may not have a plurality of sub-pixels and part of the imaging pixels (such as discretely arranged imaging pixels) may have a plurality of sub-pixels.

<Relationship Between Phase Difference and Defocus Amount>

Figure 4:
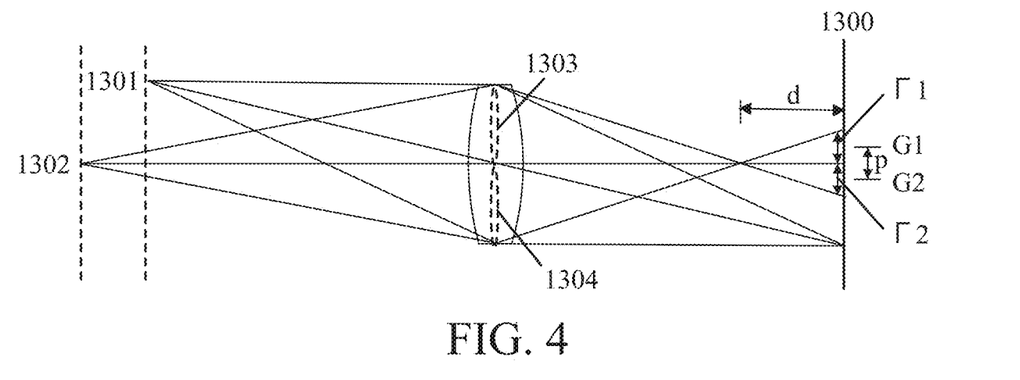
FIG. 4 explains pupil-division type focus detection.

Referring now to FIG. 4, a description will be given of a relationship between the phase difference (image shift amount) between a pair of focus detecting signals acquired from the image sensor 211, and the defocus amount. The defocus amount is used for AF processing and distance information acquisition. Now assume that the center of the image sensor coincides with the optical axis position of the optical system. A description will be given of a case where the right-eye imaging unit 200R calculates the defocus amount. However, the left-eye imaging unit 200L may calculate the defocus amount, or the right-eye imaging unit 200R and the left-eye imaging unit 200L may calculate the defocus amount and combine them to obtain the defocus amount.

In FIG. 4, the imaging plane of the image sensor 211R is placed on the image plane 1300. The exit pupil of the optical system 202R is divided by a microlens for each pixel of the image sensor 211R into a first pupil area 1303 through which a first light beam from the object (1301, 1302) is transmitted and a second pupil area 1304 through which a second light beam from the object is transmitted.

A defocus amount d is defined by magnitude as a distance from the imaging position of the light beam from the object to an imaging plane (1300). d<0 is a front focus state in which the imaging position is closer to the object than the imaging plane. d>0 is a rear focus state in which the imaging position of the object is closer to the opposite side of the object than the imaging plane. d=0 is an in-focus state in which the imaging position of the object is located on the imaging plane. FIG. 4 illustrates the in-focus state for an object 1301 and the front focus state for an object 1302. A combination of the front focus state and the rear focus state will be referred to as a defocus state (|d|>0).

In the front focus state, among the light beams from the object 1302, the light beams that have passed through the first pupil area 1303 and the second pupil area 1304 are once condensed, then expand to have blur widths Γ1 and Γ2 centering on center-of-gravity positions G1 and G2 of the light beams, form blurred images on the imaging plane. Each of these blurred images is received by two sub-pixels (402 and 403 in FIG. 3) in each of a plurality of imaging pixels included in the range where the blurred image is formed. A pair of focus detecting signals are generated by combining the A signal and the B signal from two sub-pixels in a plurality of imaging pixels.

The blur widths Γ1 and Γ2 of the object image increase approximately in proportion to the increase in the magnitude of the defocus amount d. Similarly, the magnitude of the image shift amount p (center-of-gravity position difference G1–G2) between a pair of focus detecting signals also increases approximately in proportion to the increase in the magnitude of the defocus amount d. The rear focus state is similar though an image shift direction shift between a pair of focus detecting signals is opposite to that in the front focus state.

The defocus amount d can be calculated by multiplying the image shift amount p by a known conversion coefficient K. The conversion coefficient K is a value that depends on the optical system, and more specifically a value that depends on the incident angle of the light beam on the optical system, the F-number of the optical system, and the optical axis position of the optical system.

<Display Switching According to Luminance of Imaging Environment>

This embodiment performs display control according to the luminance of the imaging environment in order to present a 3D image to the user and obtain an excellent focus detection result (that is, an AF result). The luminance of the imaging environment is the luminance of the environment in which the object is placed, and more specifically the luminance of the object. The object includes a main object and a background object. In the following description, imaging environments having different luminances are divided into four cases (luminance levels) from Case 1 to Case 4, but the number of cases may be varied.

Figure 5:
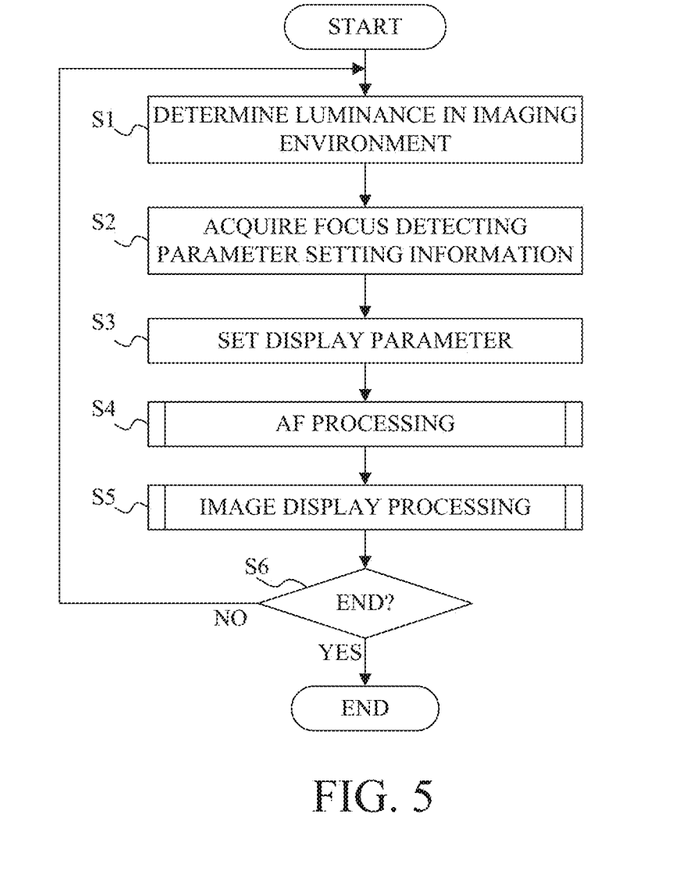
FIG. 5 is a flowchart illustrating main processing executed by the HMD according to the embodiment.

A flowchart in FIG. 5 illustrates main processing executed by the system control unit 218 according to the program. The system control unit 218 and the image processing unit 214 correspond to a processing unit and an acquiring unit, and constitute an image processing apparatus.

In step S1, the system control unit 218 determines the luminance of the imaging environment. The charge accumulation time (shutter time) of the image sensor set as the AE processing result is used for luminance determination. As described above, this embodiment performs the AE processing using the luminance information obtained from image data. However, the HMD 100 may include a photometry (light measuring) unit that measures the luminance of the imaging environment, and the HMD 100 may perform the AE processing using the photometry result of the photometry unit as the luminance information. Instead of the AE processing result, luminance determination may be performed directly based on whether the luminance information is bright (predetermined luminance) or darker.

Figure 6:
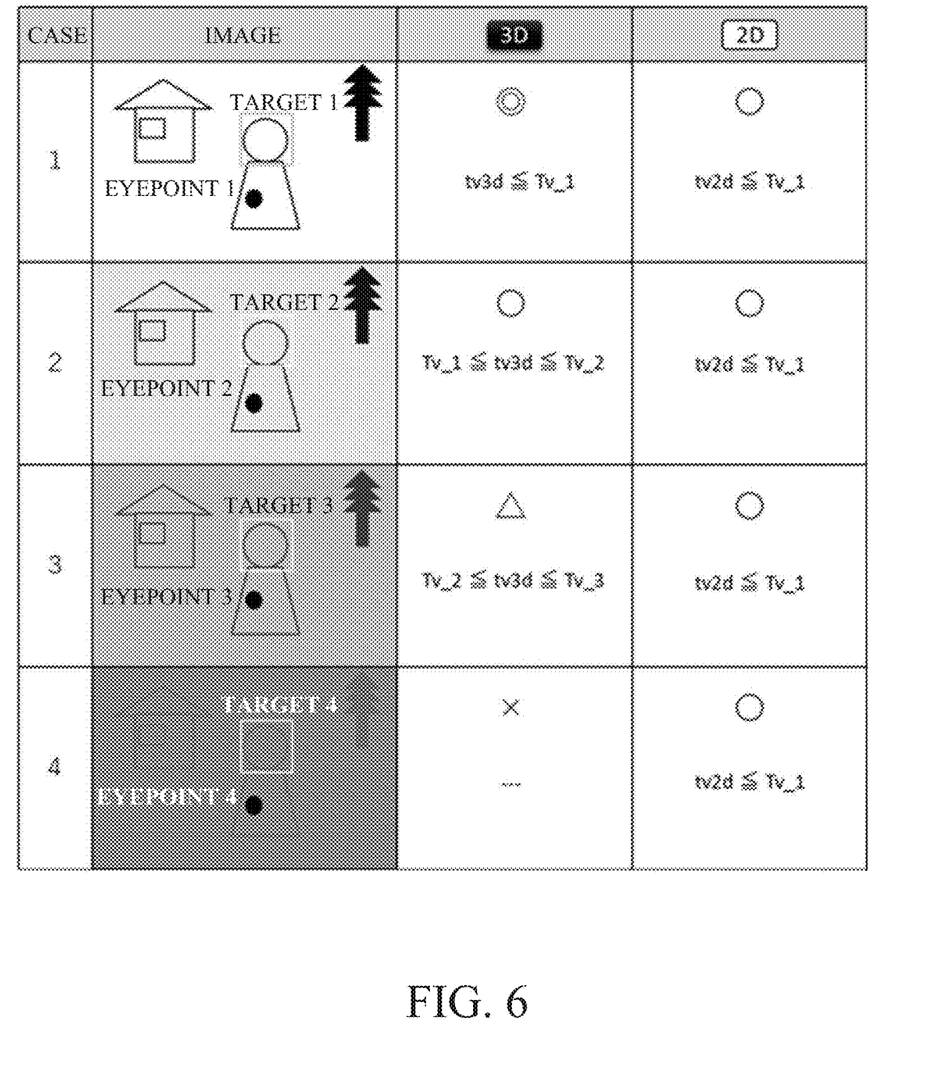
FIG. 6 illustrates display switching between a 3D image and a 2D image according to luminance.

FIG. 6 illustrates Cases 1, 2, 3, and 4 in order from a high luminance side, with an example (image) of an imaging scene for each Case. FIG. 6 illustrates whether or not a 3D image and a two-dimensional (2D) image can be displayed (upper part) and the determination condition (lower part) for each case. In the following description, a mode for displaying 3D images will be called a 3D display mode, and a mode for displaying 2D images will be referred to as a 2D display mode. tv3d and tv2d in the determination condition indicate the charge accumulation time of the image sensor in the 3D display mode and the 2D display mode, respectively. Tv_1, Tv_2, and Tv_3 are thresholds for the charge accumulation time, and are longer in this order. Tv_1, Tv_2 and Tv_3 correspond to predetermined times in Cases 1, 2, and 3, respectively.

Case 1 corresponds to the brightest imaging environment, and signals can be read out of the image sensor at a high frame rate (FR) and high speed to acquire right-eye image data and left-eye image data for 3D display. In Case 1, the 3D image display and 2D image display are always available. A short time equal to or less than the first threshold value Tv_1 is set as the charge accumulation times tv3d and tv2d in the 3D and 2D display modes. Tv_1 is a time shorter than 1/60 second, for example.

This embodiment sets the charge accumulation time tv2d for the 2D display mode to time equal to or less than Tv_1 in any of Case1 to Case4. This is because a method can be selected of acquiring an image for the 2D image display by only one of the right-eye imaging unit 200R and the left-eye imaging unit 200L or by alternately acquiring the image for the 2D image display by the right-eye imaging unit 200R and the left-eye imaging unit 200L. In addition, image data with a wide dynamic range may be generated from the right-eye image data acquired through the right-eye imaging unit 200R and the left-eye image data acquired through the left-eye imaging unit 200L with an exposure condition (charge accumulation time, etc.) different from that of the right-eye imaging unit 200R. Two identical images (third images) corresponding to this wide dynamic range image data may be two-dimensionally displayed on the right-eye display element 217R and the left-eye display element 217L.

In Case 1, the system control unit 218 selects the 3D display mode. However, the 2D display mode and the 3D display mode may be selected (changed) by a selection operation by the user.

Case 2 corresponds to an imaging environment darker (lower luminance) than Case 1, but is relatively bright. A signal can be read out of the image sensor at high FR to intermediate FR and high speed to intermediate speed in order to acquire images necessary for the 3D image display. In Case 2, a 2D image can be always displayed. On the other hand, a 3D image can be displayed in a case where a time equal to or longer than the first threshold Tv_1 and equal to or shorter than the second threshold Tv_2 is set as the charge accumulation time tv3d. Tv_2 is a time, such as 1/30 second, in which the high FR can be maintained. The system control unit 218 selects the 3D display mode in a case where tv3d is shorter than or equal to Tv_2, and selects the 2D display mode in a case where tv3d is longer than Tv_2.

In a case where tv3d is equal to or shorter than Tv_2, the user may select (change) one of the 2D display mode and the 3D display mode through a selection operation.

Case 3 corresponds to an imaging environment darker (relatively darker) than Case 2, and signals can be read out of the image sensor at intermediate FR and intermediate speed in order to acquire images necessary for the 3D image display. In Case 3, a 2D image can be always displayed. On the other hand, a 3D image can be displayed in a case where the charge accumulation time tv3d is set to be equal to or longer than the second threshold Tv_2 and equal to or shorter than the third threshold Tv_3. Tv_3 is a time longer than 1/30 second, for example. Therefore, Case 3 is limited to cases where the user is stationary or slowly moving. The system control unit 218 selects the 3D display mode in a case where tv3d is equal to or shorter than Tv_3, and selects the 2D display mode in a case where tv3d is longer than Tv_3.

Only if the user permits the 3D image display with the charge accumulation time tv3d corresponding to the third threshold Tv_3, the user may select (change) the 2D display mode or the 3D display mode by a selection operation.

Case 4 corresponds to an imaging environment darker than in Case 3, and in order to acquire the images necessary for the 3D image display, signals can read out of the image sensor at intermediate FR to low FR and intermediate speed to low speed. Therefore, a 3D image cannot be displayed, and only a 2D image can be displayed.

Even in Case 4, in a case where the user permits 3D image display with a charge accumulation time longer than the third threshold Tv_3, the user may select the 3D display mode through his selection operation.

Even in a case where the 3D image can be displayed in Cases 1 to 3, the 2D display mode may be selected in a case where the main object is located at a long distance. Whether or not it is the main object can be determined using the visual line information from the eyeball information acquiring unit 240. The distance of the main object can be obtained from a distance map generated from the defocus amount distribution within the imaging angle of view.

Next, in step S2, the system control unit 218 sets a focus detecting parameter and acquires information according to the luminance of the imaging environment determined in step S1. The luminances of Cases 1, 2, and 3 corresponds to first luminance, and the luminance of Case 4 corresponds to second luminance.

In a case where the luminance determined in step S1 is the luminance of Case 1, the system control unit 218 sets time corresponding to the first threshold value Tv_1 as the charge accumulation time tvAF of the image sensor for acquiring the focus detecting signal. In this case, the system control unit 218 sets the acquiring range of the focus detecting signal (focus detecting range) to the entire image sensor (imaging plane). The system control unit 218 also detects a main object Target1 illustrated in FIG. 6 from the image data, and acquires object information such as the type, position, and distance of the main object Target1. The system control unit 218 acquires information about the visual line of the user through the eyeball information acquiring unit 240, and detects a gaze area EyePoint1 of the user from the visual line information. In this case, the system control unit 218 may determine that the user is gazing at the main object from the object information and the gaze area, and use the focus detection result near EyePoint1 for AF processing.

In a case where the luminance determined in step S1 is the luminance of Case 2, the system control unit 218 sets the charge accumulation time tvAF for acquiring the focus detecting signal as follows. In a case where the 2D display mode is set, the system control unit 218 sets the time corresponding to the first threshold Tv_1 as tvAF, and in a case where the 3D display mode is set, the system control unit 218 sets the time corresponding to the second threshold Tv_2 as tvAF. The system control unit 218 sets the focus detecting range to a range narrower than that of Case 1. The system control unit 218 also detects a main object Target2 illustrated in FIG. 6 from the image data, and acquires the object information on the main object Target2. The system control unit 218 acquires the visual line information on the user through the eyeball information acquiring unit 240, and detects a gaze area EyePoint2 of the user from the visual line information. In this case, the system control unit 218 may determine that the user is gazing at the main object from the object information and the gaze area, and use the focus detection result near EyePoint2 for AF processing.

In a case where the luminance determined in step S1 is the luminance of Case 3, the system control unit 218 sets the following time as the charge accumulation time tvAF to acquire the focus detecting signal. In a case where the 2D display mode is set, the system control unit 218 sets the time corresponding to the first threshold Tv_1 as tvAF, and in a case where the 3D display mode is set, the system control unit 218 sets the time corresponding to the third threshold Tv_3 as tvAF. The system control unit 218 sets the focus detecting range to a range narrower than in Case2. The system control unit 218 also detects a main object Target3 illustrated in FIG. 6 from the image data, and acquires the object information on the main object Target3. The system control unit 218 acquires the visual line information on the user through the eyeball information acquiring unit 240, and detects a gaze area EyePoint3 of the user from the visual line information. In this case, the system control unit 218 may determine that the user is gazing at the main object from the object information and the gaze area, and use the focus detection result near EyePoint3 for AF processing.

In a case where the luminance determined in step S1 is the luminance of Case 4, the system control unit 218 sets the time corresponding to the first threshold value Tv_1 in the 2D display mode as the charge accumulation time tvAF for acquiring the focus detecting signal. At this time, the system control unit 218 may add up focus detecting signals obtained in a plurality of frames and use the result for focus detection. The system control unit 218 sets the focus detecting range to a range narrower than that of Case 2, similarly to Case 3. The system control unit 218 also detects a main object Target4 illustrated in FIG. 6 from the image data, and acquires the object information on the main object Target4. The system control unit 218 acquires the visual line information on the user through the eyeball information acquiring unit 240, and detects a gaze area EyePoint4 of the user from the visual line information. In this case, the system control unit 218 may determine that the user is gazing at the main object from the object information and the gaze area, and use the focus detection result near EyePoint4 for AF processing.

Next, in step S3, the system control unit 218 sets the display parameters of the right-eye display element 217R and the left-eye display element 217L in accordance with the charge accumulation times (tv3d, tv2d) for acquiring the imaging signal (image data) according to the luminance determination result in step S1. Then, the flow proceeds to step 4.

This embodiment displays a 3D image by displaying a right-eye image and a left-eye image having parallax on the right-eye display element 217R and the left-eye display element 217L, and performs focus detection using the focus detecting signal acquired from the right-eye imaging unit 200R and left-eye imaging unit 200L. Since the charge accumulation time tvAF for acquiring the focus detecting signal at this time and the charge accumulation time tv3d for acquiring the imaging signal for displaying a 3D image coincide with each other, a 3D image can be displayed at high FR and focus detection can be performed at a high speed.

However, it can be difficult to maintain high FR, especially in dark Case 4. In such a case, the charge accumulation time tvAF for acquiring the focus detecting signal is set to the charge accumulation time tv2d for acquiring the imaging signal for 2D image display. One of the right-eye imaging unit 200R and the left-eye imaging unit 200L acquires an imaging signal for displaying a 2D image, the same image (third image) is displayed on the right-eye display element 217R and the left-eye display element 217L, and a focus detecting signal is acquired by the other imaging unit. Thereby, image display and focus detection are continued. Although the focus detecting frequency decreases, focus detection may be performed with a focus detecting signal added over a plurality of frames in order to continue the 3D image display. In a case where the imaging environment is so dark that focus detection cannot be performed, the user may be notified through display or the like that focus detection cannot be performed without performing focus detection.

In step S4, the system control unit 218 performs focus detection based on the focus detecting parameter set in step S2, controls driving of the optical system based on the resultant defocus amount, and performs focusing (AF processing). Details of the AF processing will be described below.

Next, in step S5, the system control unit 218 performs image processing (image display processing) for image display according to the display parameter set in step S3. Details of the image processing here will be described below.

In step S6, the system control unit 218 that has performed the image processing determines whether or not to end image display and focus detection in response to a stop command from the user, power off of the HMD 100, detection of eye separation by the eye approach detector 118, or the like. In a case where image display and focus detection are to be continued, the flow returns to step S1.

Figure 7:
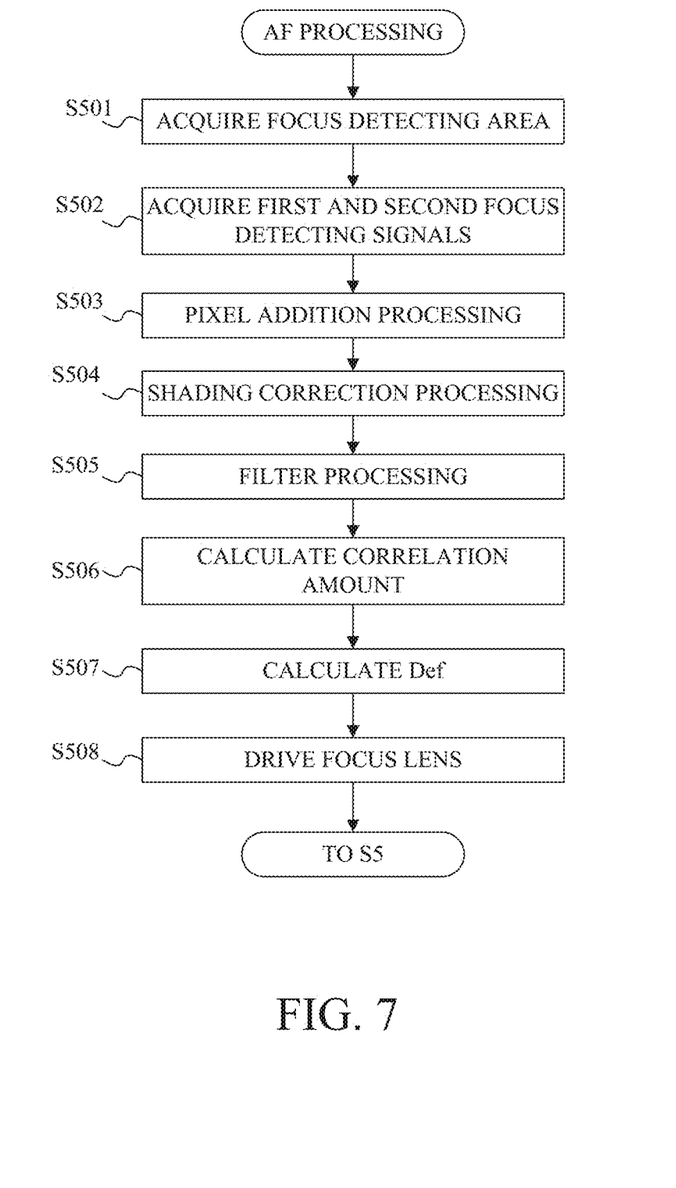
FIG. 7 is a flowchart illustrating focusing processing within the main processing.

A flowchart in FIG. 7 illustrates the focusing processing executed in step S4 in FIG. 5. The right-eye optical system 202R and the left-eye optical system 202L may are different in an in-focus position due to mechanical factors, but there is no difference in focus detecting processing. Therefore, the right-eye optical system 202R and the left-eye optical system 202L are collectively referred to as the optical system 202, and the right-eye image sensor 211R and the left-eye image sensor 211L are collectively referred to as the image sensor 211.

This embodiment generates a first focus detecting signal by collecting (combining) signals from the sub-pixels 402 among a plurality of imaging pixels within an acquiring range of the focus detecting signal of the image sensor 211, and a second focus detecting signal by collecting signals from the sub-pixels 403. At this time, both the first and second focus detecting signals are generated as a Y signal by adding signals from four sub-pixels of green (G), red (R), blue (B), and green (G). The system control unit 218 calculates the image shift amount p of these first and second focus detecting signals (a pair of focus detecting signals) by correlation calculation, and calculates the defocus amount d from the image shift amount p.

In step S501, the system control unit 218 sets the acquiring range (focus detecting range) of the focus detecting signal acquired in step S2 of FIG. 5.

Next, in step S502, the system control unit 218 generates the first focus detecting signal (A image signal) and the second focus detecting signal (B image signal) generated based on the signals from the sub-pixels 402 and 403 within the focus detecting range.

Next, in step S503, the system control unit 218 performs pixel addition processing for each of the first and second focus detecting signals. More specifically, addition processing in the column direction is performed to suppress a signal data amount of the first and second focus detecting signals, and addition processing of G, R, B, and G is performed to obtain the Y signal. At this time, in a case where the number of pixel additions is two, the pixel pitch is doubled, so the Nyquist frequency becomes half of that when no addition is performed. The frequency becomes one-third of that when on addition is performed.

Next, in step S504, the system control unit 218 performs shading correction processing (optical correction processing) for matching the signal intensities of the first and second focus detecting signals after the pixel addition processing. The shading correction value is a value that depends on the incident angle of the light beam to the optical system 202, the F-number of the optical system 202, and the optical axis position.

Next, in step S505, the system control unit 218 performs bandpass filter processing with a specific transmission frequency band for the first and second focus detecting signals that have undergone the shading correction processing in order to improve the correlation (signal matching degree) and focus detection accuracy. Examples of the bandpass filter include a differential filter such as {1, 4, 4, 4, 0, −4, −4, −4, −1} that cuts a DC component and extracts an edge, and an additive filter such as {1, 2, 1} that suppresses a high-frequency noise component.

Next, in step S506, the system control unit 218 performs shift processing for shifting the filtered, first and second focus detecting signals in the pupil-dividing direction relative to each other, and calculates a correlation amount representing the signal matching degree. A correlation amount COR is calculated by the following equation (1):

$$COR(s) = \sum_{k \in W} |A(k) - B(k-s)|, s \in \Gamma \tag{1}$$

where A(k) is a k-the filtered, first focus detecting signal,
B(k) is a k-the filtered, second focus detecting signal,
W is a range of number k corresponding to the focus detecting range, s is a shift amount by the shift processing, and F is a shift range of the shift amount s.

The shift processing generates a shift subtraction signal by correlating with each other and subtracting the k-th first focus detecting signal A(k) and the (k-s)-th second focus detecting signal B(k-s). An absolute value of the generated shift subtraction signal is calculated, and the sum of the numbers k within the range W corresponding to the focus detecting range is calculated to calculate the correlation amount COR(s). If necessary, the correlation amount calculated for each row may be added over a plurality of rows for each shift amount. In a case where the correlation amount COR(s) is calculated, the reliability of the defocus amount, which will be calculated below, can be evaluated by checking a change amount, a peak value, a bottom value, and the like.

Next, in step S507, the system control unit 218 calculates, from the calculated correlation amount, a shift amount of a real value that minimizes the correlation amount by sub-pixel calculation, and sets this shift amount as the image shift amount p. The defocus amount (Def) d is calculated by multiplying the image shift amount p by the conversion coefficient K. The reliability of the defocus amount can be evaluated based on the magnitude of the conversion coefficient K.

Next, in step S508, the system control unit 218 converts the defocus amount acquired in step S507 into a driving amount of the focus lens in the optical system 202, and drives the focus lens. In a case where this processing ends in this way, the flow proceeds to step S5 in FIG. 5.

Figure 8:
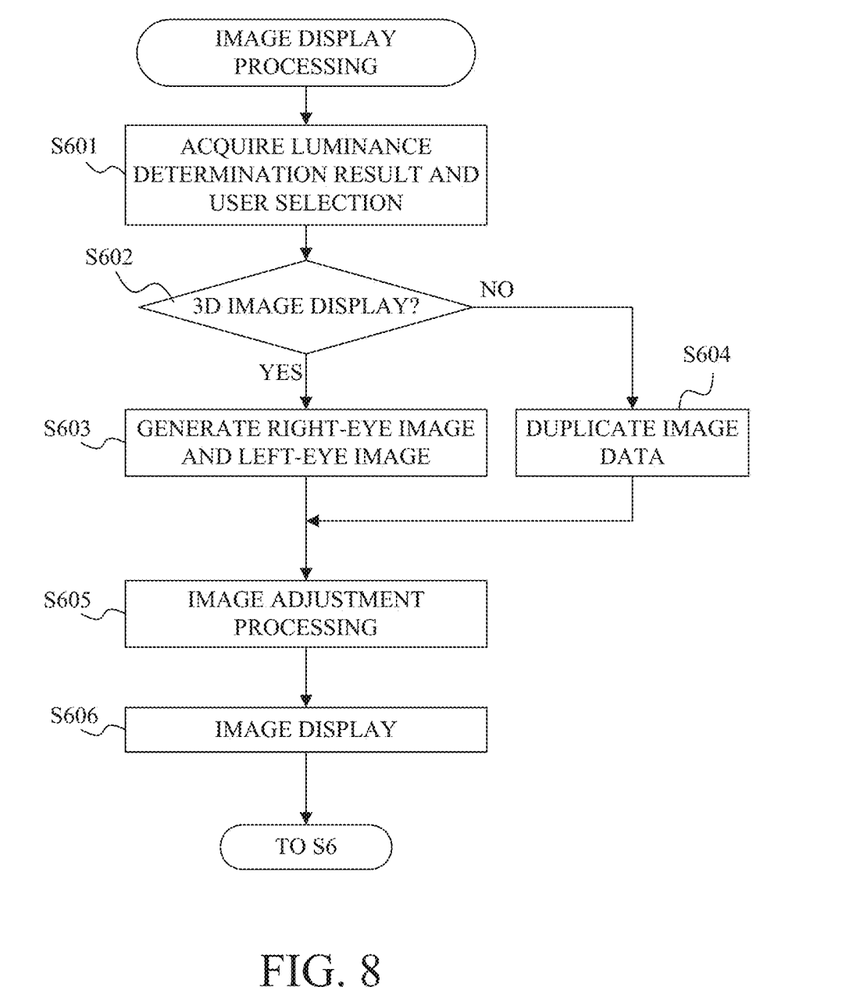
FIG. 8 is a flowchart illustrating display switching processing within the main processing.

A flowchart of FIG. 8 illustrates the image display processing (image processing method) executed in step S5. In step S601, the system control unit 218 acquires the luminance determination result in step S1 of FIG. 5 and the selection status of the 2D/3D display mode by the user.

Next, in step S602, the system control unit 218 determines whether to display a 3D image in the 3D display mode or a 2D image in the 2D display mode according to the luminance determination result acquired in step S601 and the user selection status. In performing 3D image display, the flow proceeds to step S603, and in performing 2D image display, the flow proceeds to step S604.

In step S603, the system control unit 218 causes the image processing units 214 for the right-eye imaging display unit 250R and the left-eye imaging display unit 250L to generate right-eye image data and left-eye image data having parallax based on the imaging signals from the right-eye imaging unit 200R and the left-eye imaging unit 200L. Then, the flow proceeds to step S605.

On the other hand, in step S604, the system control unit 218 duplicates the image data in order to display the same image corresponding to the image data generated by the imaging signal from the right-eye imaging unit 200R or the left-eye imaging unit 200L, on the right-eye display element 217R and left-eye display element 217L. That is, the same image data having no parallax is generated as the right-eye image data and left-eye image data. Then, the flow proceeds to step S605.

In step S605, the system control unit 218 performs image adjustment processing for displaying the right-eye image data and left-eye image data generated in step S603 or step S604 on the right-eye display element 217R and the left-eye display element 217L. More specifically, the system control unit 218 performs processing for adjusting their image display positions and luminances.

Next, in step S606, the system control unit 218 supplies the right-eye image data and left-eye image data that have undergone the image adjustment processing to the right-eye display element 217R and the left-eye display element 217L via the D/A converter 216, respectively. This configuration provides the 3D image display in which a right-eye image and a left-eye image having parallax are displayed on the right-eye display element 217R and a left-eye display element 217L, or the 2D image display in which a right-eye image and a left-eye image having no parallax are displayed on the right-eye display element 217R and a left-eye display element 217L. Then, the flow proceeds to step S6 in FIG. 5.

As described above, switching between the 3D image display and the 2D image display according to the luminance of the imaging environment can achieve both excellent image display and focus detection.

This embodiment has been described on the premise that the optical system 202 has a fixed focal length or a fixed zoom state. Switching between the 2D image display and the 3D image display may be performed according to a change in the zoom state of the optical system 202.

In this embodiment, the image processing apparatus is built in the HMD, but the image processing apparatus may be an apparatus separate from the HMD, such as a personal computer or an image controller.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-109772, filed on Jul. 7, 2022, which is hereby incorporated by reference herein in its entirety.

What is claimed is:

1. An image processing apparatus comprising:
   at least one memory that stores a set of instructions; and
   at least one processor that executes the set of instructions to:
   cause at least one display element to display images using a signal obtained by imaging an object through a first optical system and a second optical system that are arranged to generate parallax,
   acquire luminance information on the object, and
   switch, according to the luminance information, between first processing for displaying a first image and a second image having parallax on the display element, and second processing for displaying two third images having no parallax on the display element.

2. The image processing apparatus according to claim 1, wherein the at least one processor is configured to:
   set a charge accumulation time of at least one image sensor that is used to image the object through the first optical system and the second optical system according to the luminance information,
   perform the first processing in a case where the charge accumulation time is shorter than a predetermined time, and
   perform the second processing in a case where the charge accumulation time is longer than the predetermined time.

3. The image processing apparatus according to claim 1, wherein the at least one processor is configured to:
   perform the first processing in a case where the luminance information indicates that luminance is brighter than predetermined luminance, and
   perform the second processing in a case where the luminance information indicates that the luminance is darker than the predetermined luminance.

4. The image processing apparatus according to claim 1, wherein the at least one processor is configured to:
   divide a luminance level of the object into a plurality of levels, and
   switch between the first processing and the second processing for each luminance level.

5. The image processing apparatus according to claim 1, wherein the at least one processor is configured to perform the first processing and the second processing, and to perform focus detection using the signal obtained by imaging the object through the first optical system and the second optical system.

6. The image processing apparatus according to claim 5, wherein at least one image sensor that is used to image the object includes a first imaging area for imaging the object through the first optical system, and a second imaging area for imaging the object through the second optical system, and
   wherein the at least one processor is configured to perform the focus detection using a signal from the first imaging area and a signal from the second imaging area in performing the first processing.

7. The image processing apparatus according to claim 5, wherein at least one image sensor that is used to image the object includes a first imaging area for imaging the object through the first optical system, and a second imaging area for imaging the object through the second optical system,
   wherein in performing the second processing, the at least one processor is configured to:
   cause the display element to display the two third images using a signal from one of the first imaging area and the second imaging area; and
   perform the focus detection using a signal from the other of the first imaging area and the second imaging area.

8. The image processing apparatus according to claim 1, wherein the at least one processor is configured to:
   cause the display element to display images using a signal from at least one image sensor that includes a first imaging area for imaging the object through the first optical system, and a second imaging area for imaging the object through the second optical system, and
   in performing the second processing, cause the display element to display the two third images generated from a signal from the first imaging area and a signal from the second imaging area for imaging under a different exposure condition from that of the first imaging area.

9. The image processing apparatus according to claim 1, wherein the at least one processor is configured to switch from the first processing to the second processing according to a distance to a main object gazed at by a user.

10. The image processing apparatus according to claim 1, wherein the at least one processor is configured to switch from one of the first processing and the second processing to the other of the first processing and the second processing according to a selection of a user.

11. The image processing apparatus according to claim 1, wherein the display element include a first display element and a second display element,
   in performing the first processing, the at least one processor is configured to cause the first display element to display the first image and the second display element to display the second image; and
   in performing the second processing, the at least one processor is configured to cause the first display element and the second display element to display the third images.

12. The image processing apparatus of claim 1, wherein the display element include a first display area and a second display area,
   in performing the first processing, the at least one processor is configured to cause the first display area to display the first image and the second display area to display the second image; and in performing the second processing, the at least one processor is configured to cause the first display area and the second display area to display the third images.

13. A display apparatus comprising:
an image processing apparatus;
a first optical system and a second optical system that are arranged to generate parallax; and
at least one display element,
wherein the image processing apparatus includes:
at least one memory that stores a set of instructions; and
at least one processor that executes the set of instructions to:
cause the display element to display images using a signal obtained by imaging an object through the first optical system and the second optical system,
acquire luminance information on the object, and
switch, according to the luminance information, between first processing for displaying a first image and a second image having parallax on the display element, and second processing for displaying two third images having no parallax on the display element.

14. An image processing method comprising the steps of:
causing at least one display element to display images using a signal obtained by imaging an object through a first optical system and a second optical system that are arranged to generate parallax,
acquiring luminance information on the object, and
switching, according to the luminance information, between first processing for displaying a first image and a second image having parallax on the display element, and second processing for displaying two third images having no parallax on the display element.

15. A non-transitory computer-readable storage medium storing a program that causes a computer to execute processing according to the image processing method according to claim 14.

* * * * *